Patented June 6, 1950

2,510,886

UNITED STATES PATENT OFFICE 2,510,886

AMIDE-EPOXY-PHENOL COMPOSITIONS

Sylvan Owen Greenlee, Louisville, Ky., assignor to Devoe & Raynolds Company, Inc., Louisville, Ky., a corporation of New York No Drawing. Application March 8, 1946, Serial No. 653,154

12 Claims. (Cl. 260—2)

This invention relates to new plastic compositions and products, which are valuable for use in the manufacture of varnishes and coating compositions, molding compositions, adhesives, films, molded articles, etc.

The invention includes the new compositions and products, and methods for their production.

The new compositions are made of mixtures of polyhydric phenols, amides, and polyepoxides in regulated proportions, which are reacted to form complex reaction products, the reaction taking place by direct addition reactions and without the formation of undesirable byproducts. The invention includes compositions of the reacting materials as well as partial and final reaction products therefrom.

In my prior application, Serial No. 632,595, filed December 3, 1945, I have described new complex amide-epoxide compositions made by reacting amides with complex epoxides which are themselves produced by the reaction of polyhydric phenols with polyfunctional halohydrins or with polyepoxides to form complex reaction products containing terminal epoxide groups.

The present invention relates to new compositions made by admixing and reacting polyepoxides with both amides and polyhydric phenols and to compositions for use in making such reaction products.

One of the objects of the invention is the production of new reaction mixtures containing polyepoxides, polyfunctional phenols and amides which will react through direct addition reactions of epoxide groups with amide and with phenolic hydroxyl groups to form complex plastic compositions.

Another object of the invention is the production of reaction mixtures of polyhydric phenols, amides and polyepoxides in proportions capable of reacting by direct addition reactions of epoxide with amide and phenolic hydroxyl groups to form complex plastic compositions.

Another object of the invention is the production of partial reaction products of polyepoxides and polyfunctional phenols and amides which are capable of further reaction to form final reaction products and particularly infusible products obtained by further heating of the intermediate reaction products.

Another object of the invention is the production of infusible products by heating in the presence of a catalyst or without a catalyst of polyfunctional reactants containing epoxide, amide and phenolic hydroxyl groups in such proportion that infusible products are obtained.

Another object of the invention is the production of complex polymeric products by the reaction of mixtures of polyhydric phenols and amides with polyepoxides in proportion such that polymeric chains are formed containing a plurality of polyhydric phenol residues and amide residues united through polyhydroxy containing nuclei from polyepoxides and with terminal epoxy-hydroxy containing groups.

Another object of the invention is the production of compositions containing polyhydric phenols, amides and polyepoxides in proportions suitable for reaction by direct addition and without the formation of by products to form infusible resins, films, molding compositions, etc.

Another object of the invention is the production of intermediate reaction products of polyfunctional phenols and amides with polyepoxides which are capable of further reaction to form insoluble, infusible products, and the preparation of higher molecular weight and more complex compositions from such lower molecular weight intermediate reaction products.

Another object of the invention is the production of complex, polymeric reaction products of polyfunctional phenols and amides with polyepoxides, said complex reaction products having terminal epoxide groups and intermediate hydroxyl groups and being capable of reaction to form final insoluble, infusible products.

Another object of the invention is the production of films, articles, molded products, and other final reaction products of outstanding properties from such polyepoxide compositions.

Another object of the invention is the production of reaction mixtures and reaction products from polyfunctional amido-phenols and polyepoxides in suitable proportions for reaction to form final plastic compositions or intermediate compositions capable of further reaction to form such final compositions.

Other objects of the invention will appear from the following more detailed description.

The new compositions are made from polyepoxides by reaction with polyfunctional amides and phenols, and particularly from polyepoxides, polyhydric phenols and amides, which are admixed and caused to react with each other in forming the intermediate and final products. Depending upon the proportions of reagents, products of varying characteristics and properties can be produced.

The epoxide groups of the polyepoxides will react by direct addition reactions with phenolic hydroxyls and with amide groups to form addition reactions products. The epoxide groups are also capable of reaction with alcoholic hydroxy groups contained in the intermediate reaction products. By starting with proportions of polyepoxide, polyhydric phenol and amide with the polyepoxide in sufficient excess, intermediate reaction products can be produced which contain terminal epoxide groups capable of further reaction with alcoholic hydroxyl or other reactive groups in forming the final reaction products.

Various polyfunctional phenols, amides and polyepoxides can be used in making the new compositions and products.

The polyhydric phenols used in making the new products and compositions include phenols containing two or more phenolic hydroxyl groups which may be in one nucleus as in resorcinol or in different nuclei of fused ring systems as in 1,5-dihydroxy naphthalene, or in different nuclei of ring systems attached by chains composed of one or more atoms in which case the chains should be free from elements which interfere with the reaction of the polyepoxides with the phenolic hydroxyl groups or with the amide hydrogens. The phenolic nuclei or the chains linking phenolic nuclei may contain substituents providing they do not interfere with the desired reactions.

Illustrative of polyhydric phenols which may be used in making the new complex polymerization products are mono-nuclear phenols such as resorcinol, hydroquinone, catechol, phloroglucinol, etc. and polynuclear phenols such as bis phenol (p,p'-dihydroxy diphenyl dimethyl methane), p,p'-dihydroxy benzophenone, p,p'-dihydroxy diphenyl, p,p'-dihydroxy dibenzyl, bis-(4-hydroxy phenyl) sulfone, 2,2'-dihydroxy 1,1'-dinaphthyl methane, polyhydroxy naphthalenes and anthracenes, o-p, o'-p'-tetrahydroxy diphenyl dimethyl methane and other dihydroxy or polyhydroxy diphenyl or dinaphthyl dialkyl methanes, etc.

The polyhydric phenols may themselves be complex reaction products, e. g. of 2 mols of a dihydric phenol with 1 mol of a diepoxide, or of 3 mols of a dihydric phenol with 2 mols of a diepoxide, etc., and containing free phenolic hydroxyls on each terminal dihydric phenol nucleus. More complex and higher polymeric products resulting from the reaction of, e. g., dihydric phenol with less than the equivalent amount of diepoxide to give reaction products containing terminal phenolic hydroxyl groups, can similarly be used.

The polyhydric phenols may also be complex reaction products of simpler polyhydric phenols, such as bis phenol, with dichlorides such as di-chlordiethyl ether, dichlorbutene, etc., in the presence of caustic soda and in proportions so that the resulting reaction products will contain terminal phenolic hydroxyl groups. Thus a complex polyhydric phenol may be produced from bis phenol with dichlordiethyl ether and caustic alkali which may be assumed to have the following formula:

in which R is the residue from bis phenol and $n$ indicates the degree of polymerization which may be, e. g., 1, 2, etc. Complex polyhydric phenols from, e. g., bis phenol and dichlorbutene with the use of caustic alkali may be assumed to have the following general formula:

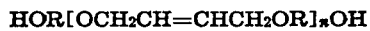

in which R and $n$ have the meaning indicated above. The complex polyhydric phenols thus produced, from dichlorides and simpler polyhydric phenols, are more complex or polymeric products in which, e. g., two simpler dihydric phenol residues are united through a residue from the dichloride. With less than two molecular proportions of the simpler dihydric phenol to one of the dichloride, and with the simpler dihydric phenol used in excess of the dichloride, a polymeric product is produced in which, e. g., 3 mols of dihydric phenol are reacted with 2 mols of dichloride; or to give products of a higher degree of polymerization.

The polyfunctional amides and phenols may in some cases be amido-phenols containing one or more phenolic hydroxyl groups and one or more amide groups containing at least one active hydrogen. Both the phenolic hydroxyl group or groups and the amide group or groups with at least one active hydrogen can react with epoxide groups of the polyepoxides by direct addition.

Various amides, and particularly primary amides and polyfunctional amides, are useful in making the new polyhydric phenol-amide-polyepoxide compositions and products. Apparently all hydrogens directly attached to nitrogen are active hydrogens in reacting with epoxide groups. The polyamides appear to be more active with the epoxide groups than are the monoamides and in many cases no catalyst is required to promote reaction of epoxide groups with the polyamides. This apparent greater reactivity of polyamides may be due to the extra crosslinking obtained due to the fact that the functionality is greater rather than to the fact that amido-hydrogens in such polyamides are actually more active. With most amides, especially the mono-amides, it is advantageous to use a catalyst, particularly if high molecular weight infusible products are desired. Alkaline and in some cases Friedel-Crafts type catalysts have been found to be especially active in promoting the reaction of epoxide groups with amide and phenol groups.

In general, amides containing at least two active hydrogens per molecule which are directly attached to nitrogen are satisfactory materials, when used in suitable proportions, for preparing infusible products in practice of the present invention. Amides containing one hydrogen per molecule which is directly attached to nitrogen are in general satisfactory for preparing fusible polyhydric phenol-amide-epoxy products and compositions, while amides containing more than one active hydrogen per molecule directly attached to nitrogen can be used to form fusible polyhydric phenol-amide-epoxide compositions and reaction products if used in limited amounts.

Polyamides are particularly advantageous. Thus, in the case of polyamides such as urea and in diamides derived from dibasic acids, e. g., adipamide, a number of active hydrogens are provided by the different amide groups which are separated by one or more carbon atoms so that they may react with a number of epoxide groups with resultant crosslinking to give complex, polyhydric phenol-amide-epoxide reaction products.

Polyamides derived by the amidification of ethylene diamine, polyethylene polyamines, and similar polyamines with organic acids, including resin acids (for example, abietic acid) and the acids derived from fats and oils, are also advantageously reacted with the complex epoxides to give valuable polyhydric phenol-amide-epoxide reaction products. Such polyamides when made from resin acids and higher unsaturated fatty acids impart greater solubility to the intermediate compositions and greater flexibility to the final converted products. Such complex polyamides are also advantageous in that they give a means of introducing relatively cheap and plentiful raw materials of the oil and resin acid type into the new polyhydric phenol-amide-epoxide compositions. Such complex polyamides derived from drying oil acids, such as linseed oil acids, may also impart desirable drying properties to certain of the compositions made therewith.

Amino-amides which contain both amino and amide groups can similarly be used according to the present invention when making the new amide-epoxy composition, giving compositions which can be considered to be polyhydric phenol-amine-amide-epoxy compositions. Thus, where ethylene diamine and polyethylene polyamines are reacted with acids to form amides with part of the amine groups of the polyamines, there will result amino-amides containing both free amine groups and amide groups. Where high molecular weight acids such as resin acids and fatty acids derived from fats and oils are used, for example, drying oil acids, modified polyhydric phenol-amine-amide-epoxy compositons are produced, modified by the presence of the high molecular weight acid groups in the final composition.

Sulfonamides such as p-toluene sulfonamide and naphthalene sulfonamides are valuable reaction products when reacted with mixtures of polyhydric phenols and polyepoxides of the type used in practice of this invention.

The polyepoxides used for reaction with mixtures of polyhydric phenols and amides contain two or more epoxide groups and are free from functional groups other than epoxy and hydroxy groups. The simples diepoxides will contain at least four carbon atoms, as in the case of 1,2-epoxy-3,4-epoxy butane. The epoxy groups may be separated from each other by ether groups or linkages as in the case of bis-(2,3-epoxy propyl) ether, bis-(2,3-epoxy 2-methyl propyl) ether, etc. The poly-epoxides may also be of a somewhat more complex character such as those which result from the reaction of 2 or more mols of a diepoxide with 1 mol of a dihydric phenol, or the reaction of 3 or more mols of a diepoxide with 1 mol of a trihydric phenol, etc. Diepoxides or polyepoxides derived from polyhydric alcohols such as mannitol, sorbitol, erythritol or polyallyl alcohol may also be used. The polyepoxy compounds used may have varying structures and may be of complex structure so long as they do not contain groups which interfere with the reaction between the epoxide groups and the phenolic hydroxyl groups or amide groups.

The simpler diepoxides can be produced and obtained of a high degree of purity by fractional distillation to separate them from by-products formed during their manufacture. Thus bis-(2,3-epoxy propyl) ether, diglycid ether, can be produced and separated by fractional distillation to give products of high purity, around 97% or higher as determined by the method of epoxide analysis hereinafter referred to. When polyepoxides are produced of higher molecular weight and which are difficult to isolate by fractional distillation they can nevertheless be advantageously used, after purification to remove objectionable inorganic impurities and catalysts such as caustic alkali and without separation of the diepoxides or polyepoxides from admixed by-products such as monoepoxide products, etc.

Valuable polyepoxides for use in making the new compositions can be obtained by the reaction of epichlorhydrin on polyhydric alcohols containing 3 or more hydroxyl groups. Thus, a trihydric alcohol such as glycerol or trimethylol propane can be reacted with epichlorhydrin in the proportions of 1 mol of trihydric alcohol to 3 mols of epichlorhydrin, using a catalyst which will promote the reaction of the epoxide group of the epichlorhydrin with a hydroxyl group of the alcohol, and with subsequent treatment of the reaction product to remove chlorine from the reaction product and to produce a polyepoxide. Such polyepoxides may contain, e. g., approximately 2 epoxy groups per molecule, even though 3 mols of epichlorhydrin are reacted with 1 mol of a trihydric alcohol. More complex or side reactions apparently take place which result in the production of products containing free hydroxyl groups or cyclic ring compounds or polymeric compounds which may be present in the resulting product. But such polyepoxide products can nevertheless advantageously be used as polyepoxides for reaction with amines and polyhydric phenols in forming the new compositions.

The polyepoxides used may contain small and varying amounts of admixed monoepoxides. To the extent that monoepoxides are present they will react with the polyhydric phenols and amides to form terminal groups or residues containing hydroxyl groups and to the extent that such terminal hydroxyl groups are present the complex polyepoxide compositions will contain complex epoxyhydroxyl compounds containing both terminal epoxide-containing residues and terminal hydroxyl-containing residues. The presence of monoepoxides or of monoepoxy hydroxyl compounds does not interfere with the production of the new products provided a sufficient amount of polyepoxide is present to serve as polyfunctional reactants with the polyhydric phenols and amides. The presence of monoepoxy hydroxyl compounds may be desirable and advantageous. During the final hardening operation and at higher temperatures the epoxy groups may react with hydroxyl groups to form more complex reaction products.

The new compositions made by the reaction of the polyfunctional phenols and amides with polyepoxides are complex reaction products. In the case where a dihydric phenol and a primary mono-amide react with a diepoxide, the reaction product might be considered to be a linear polymer in which the residues from the three reactants are all present, alternating with each other within the molecular chain. In the case where the reaction rate of the phenolic hydroxyl group of the polyhydric phenol and the amido hydrogen group with epoxide groups was the same under the reaction conditions such a polymeric product in the form of a linear polymer with the reactants alternating might be expected.

The reaction rates of amides vary somewhat depending upon the structure. Apparently polyamides are somewhat more reactive than are simple monoamides. Likewise, a difference in the reactivity may depend upon whether the substituted amides are alkyl or aryl derivatives. A difference also may exist between the reaction rate of amides derived from different types of acids, for example, the sulfonamides derived from sulfonic acids may not have the same reaction rate as the amides derived from organic carboxylic acids. Likewise, the reaction rate of a phenolic hydroxyl group with an epoxide group will depend upon the structure of the polyhydric phenol used.

In general the proportions of polyhydric phenol, amide, and polyepoxide are such as to insure reaction of epoxide groups with both phenolic hydroxyl and amide groups; that is, the amount of polyepoxide should be in excess of that equivalent to the polyhydric phenol, and also in excess of that equivalent to the amide, considering one epoxide group of the polyepoxide equivalent to one phenolic hydroxyl of the polyhydric phenol and to one active amide hydrogen. It is probable in most cases that simultaneous reaction of polyhydric phenols and amides with the polyepoxides will occur, although where the amide or the polyhydric phenol is more reactive it may be expected to react first or more rapidly while the less reactive reagent will react later or more slowly. The final reaction products will contain the polyepoxides reacted with both the polyhydric phenols and the amides in a complex reaction product or mixture.

A further reaction which may take place is that between epoxide groups and alcoholic hydroxyl groups. The polyepoxides may themselves contain reactive alcoholic hydroxyl groups; and when an epoxide group reacts with a phenolic hydroxyl group to form an ether linkage an alcoholic hydroxyl group is formed which is capable of reaction with an epoxide group. This reaction of alcoholic hydroxyls with epoxide groups may take place particularly during the final reaction or hardening or polymerization of the intermediate reaction products, particularly where an excess of polyepoxide is used initially and terminal epoxide groups are present in the intermediate reaction products.

It is not necessary, however, that all of the phenolic hydroxyl, amide and epoxide groups should react, since an excess of one or more of the reactants or incomplete reaction products may be present in intermediate reaction products or even in the final compositions.

The reaction conditions used in the practice of the invention may vary widely, depending upon the particular ingredients used, their proportions, and the nature of the intermediate or final reaction product desired. Since the reagents react by direct addition, simple heating of the reactants may be sufficient or in some cases the addition of a small amount of a catalyst may be helpful in promoting the reaction or in enabling it to take place at a lower temperature.

Where all three reactants, i. e., the polyhydric phenol, the amide and the polyepoxide are miscible with each other, either with or without heating, a liquid mixture may be directly produced and in such cases the reaction may be carried out by simply heating the liquid mixture with or without a catalyst until the desired degree of reaction has been obtained. Such liquid mixtures of reactants, capable of reaction on heating without the formation of byproducts, form valuable reaction mixtures for use in making coating compositions, molded articles, etc.

Where the reactants are insoluble or difficultly soluble in each other their reaction may be carried out by the use of solvents, particularly in the initial reaction stages. In certain cases where the amide or high melting dihydric phenols are found to be highly insoluble in the other reactants it is advantageous to use a solvent which dissolves all of the reactants, at least to some extent, so that the reaction equilibrium may exist in solution between all of the reactants. For example, polyamides, such as urea, thiourea and adipamide, are in many cases insoluble in mixtures with polyepoxides and polyhydric phenol and in such cases it has been found advantageous to heat the reaction mixture with or without catalyst in the presence of a small amount of water which dissolves an appreciable amount of all the reactants at the reaction temperature. In certain cases it is desirable to use an organic solvent as a reaction medium. In cases where solvents are used as the reaction mediums, the reaction may be carried just far enough to cause all the reactants to be completely miscible in each other, then the solvent may be removed and further conversion continued until the desired product is obtained.

The temperature and time required for carrying out the process will also depend upon the particular reactants used and the type of product desired. With highly reactive polyhydric phenols and highly reactive amides, short reaction times and low temperatures may be sufficient to cause the reaction to go to completion. With less reactive mixtures, longer periods of time, higher temperatures and in some cases catalysts are necessarily or advantageously used. In some cases it is desirable to form and isolate an intermediate reaction product which is still soluble and which may be used to give the final insoluble infusible product. In such cases it is sometimes desirable to heat the reaction mixtures without a catalyst to obtain the intermediate product or composition and to carry out the further conversion by heating in the presence of catalysts.

The final conversion may be carried out in a mold in which case the reaction mixture is converted without the use of a solvent. It is also often desirable to make a solution of the intermediate product which may be treated with a catalyst to give a varnish suitable for the application of films, impregnation of fabrics and other porous materials. With still other combinations it is possible to have mixtures which are liquids, without the addition of solvents, suitable for use as varnishes for protective coatings and for impregnation purposes.

Products of different types and properties can be obtained depending upon the nature and proportions of the reagents used and on the reaction conditions. Valuable compositions are obtained when quantities of polyepoxide are used in excess of that necessary to react with all of the hydroxyl groups of the polyhydric phenols and all of the active hydrogens of the amide. In such cases the resulting composition will contain unreacted epoxide groups which are capable of further reaction with hydroxyl groups present in the composition to give the final infusible products.

Products of a somewhat different nature are obtained when the quantities of polyhydric phenols and amides used are in excess of that necessary to react with all of the epoxide groups. In such cases the resulting compositions will contain unreacted phenolic hydroxyl groups or unreacted amide groups or both. Such reaction products are desirable for further reaction with polyfunctional reactants capable of reacting with phenolic hydroxyl or amide groups such as added polyepoxides, diisocyanates, aldehydes and other coupling reagents.

It is also sometimes desirable and advantageous to use all of the reactants in equivalent quantities, that is, in quantities such that when the reaction is complete there will be little or no free phenolic hydroxyl groups or free amide groups or free epoxide groups in the final composition.

In the case of intermediate compositions it is desirable to carry out the reaction only part way and to produce incompletely reacted products which contain both unreacted epoxide groups and unreacted phenolic hydroxyl or unreacted amide groups or both such that the intermediate compositions are capable of further reaction to convert them to insoluble and infusible products.

The invention will be further illustrated by the following specific examples but it will be understood that the invention is not limited thereto.

The first two examples do not illustrate the new compositions of the invention but illustrate the preparation of special polyepoxides suitable for use in making the new compositions.

Example I

In a reaction vessel provided with mechanical stirrer and external cooling means was placed 276 parts (3 mols) of glycerol and 828 parts (9 mols) of epichlorhydrin. To this reaction mixture was added 1 part of 45% boron trifluoride ether solution diluted with 9 parts of ether. The reaction mixture was agitated continuously. The temperature rose to 50° C. over a period of 1 hour and 44 minutes at which time external cooling with ice water was applied. The temperature was held between 49° C. and 77° C. for 1 hour and 21 minutes.

To 370 parts of this product in a reaction vessel provided with a mechanical agitator and a reflux condenser was added 900 parts of dioxane and 300 parts of powdered sodium aluminate. With continuous agitation this reaction mixture was gradually heated to 93° C. over a period of 1 hour and 51 minutes, and held at this temperature for 8 hours and 49 minutes. After cooling to room temperature the inorganic material was removed by filtration. The dioxane and low boiling products were removed by heating the filtrate to 205° C. at 20 mm. pressure to give 261 parts of a pale yellow product.

This product can be distilled at temperatures above 200° C. at 2 mm. pressure provided it is sufficiently freed from impurities but unless care is taken it is liable to undergo a violent exothermic reaction. It is not, however, necessary to purify this product by distillation since such by-products as are present do not interfere with the use of the product as a polyepoxide.

The epoxide equivalent of this product was determined by titrating a one gram sample with an excess of pyridine containing pyridine hydrochloride (made by adding 16 cc. of concentrated hydrochloric acid per liter of pyridine) at the boiling point for 20 minutes and back titrating the excess pyridine hydrochloride with 0.1 N sodium hydroxide using phenolphthalein as indicator, and considering 1HCl is equivalent to one epoxide group.

The epoxide equivalent represents the equivalent weight of the product per epoxide group. The epoxide equivalent so determined was 149. The molecular weight as determined by a standard boiling point elevation method was 324. This represents an average of 2.175 epoxide groups per molecule, assuming the determined molecular weight is the molecular weight. It is probable that the molecular weight is an average molecular weight of a product containing more than one reaction product. The average molecular weight is higher than that which would correspond to a product made up solely of the reaction product of 1 mol of glycerol with 3 mols of epichlorhydrin and it seems probable that complex reaction products are also formed, some of which may be of a polymeric or cross-linked nature. The product is, however, a valuable product for use as a polyepoxide in making the new compositions.

Example II

By a procedure similar to that described in Example I, 1 mol of trimethylol propane and 3 mols of epichlorhydrin were condensed with boron trifluoride and finally treated with sodium aluminate to give 299 parts of a pale yellow liquid. The product had an equivalent weight to epoxide of 151 and an average molecular weight of 292.2.

This corresponds to approximately 1.94 epoxide groups per molecule, assuming an average molecular weight.

The product of this example can also be distilled at high temperatures and low pressures to give a water white liquid, but such further purification is not necessary and the product obtained can be directly used in making the new compositions. Or the purified product can be produced and similarly used.

The procedure of Examples I and II can be used in preparing complex polyepoxy products from other polyhydric alcohols containing 3 or more hydroxyl groups, for example, from higher molecular weight alcohols containing 3 hydroxyl groups or from higher polyhydric alcohols such as mannitol, sorbitol, erythritol or polyallyl alcohol. For example, a polyepoxide has been obtained from polyallyl alcohol and epichlorhydrin which contained 2.45 epoxide groups per average molecular weight. In general, with polyepoxides made by the reaction of epichlorhydrin on polyhydric alcohols containing 3 or more hydroxyl groups, the number of epoxide groups per molecule (based on average molecular weight) has been found to be materially less than that corresponding to 1 epoxide group per molecule of epichlorhydrin used; but in general polyepoxides can be so produced containing an equivalent of around 2 or more epoxide groups per molecule which are valuable polyepoxides for use in making the new compositions and reaction products of the present invention.

Example III

A mixture of 15 parts urea, 130 parts of diglycid ether and 171 parts of bis phenol were heated for 1 hour at 175° C. to give a product which softened at 96° C. This product is soluble in lacquer solvents and is esterifiable with organic acids. Such products are useful as resins for the manufacture of varnishes.

Example IV

A mixture of 107 parts p,p'-dihydroxy benzophenone, 29.5 parts of acetamide and 165 diglycid ether were heated together in the presence of 1 part of sodium hydroxide for 30 minutes at 150° C. to give an insoluble product.

Example V

A complex dihydric phenol was prepared by heating together 2 mols of adipic acid and 3 mols of bis phenol in the presence of 6 mols of acetic anhydride, removing the acetic acid formed during the reaction by distillation and finally removing the excess acetic anhydride to give a product which is solid and brittle.

To 621 parts of the above dihydric phenol was added 72 parts of adipamide in 453 parts of a product of Example II. This product was heated in the presence of 1% by weight of potassium hydroxide for 4 hours at 150° C. to give an insoluble product.

*Example VI*

A mixture of 55 parts of hydroquinone, 19 parts of thiourea, 130 parts of diglycid ether and 12.5 parts of monopotassium bis-phenoxide was heated for 10 minutes at 110° C. to give an infusible, molded object.

The same mixture was dissolved in methyl ethyl ketone to give a 50% solution which was used to spread films of .003 inch thickness which when baked for 3 hours at 150° C., gave flexible, insoluble films.

*Example VII*

A mixture of 125 parts of p,p'-dihydroxy diphenyl sulfone, 139.5 parts of an amide derived from equimolar portions of ammonia and soy bean oil fatty acids, 195 parts of diglycid ether, and 28 parts of monopotassium bisphenoxide was heated for 15 minutes at 110° to give an infusible, molded object.

*Example VIII*

A mixture of 135 parts of p,p'-dihydroxy diphenyl methyl butyl methane, 30 parts of urea, 195 parts of diglycid ether and 1 part of sodium hydroxide was heated for 15 minutes at 110° C. to give an infusible, molded object.

The same mixture was dissolved in a ketone solvent to give a varnish which when spread in thin films and baked for 1 hour at 150° C. gave flexible films.

*Example IX*

A mixture of 114 parts of bis phenol, 19 parts of thiourea and 173 parts of diglycid ether were heated in the presence of 1 part of sodium hydroxide for 10 minutes at 110° C. to give an infusible product.

This same reaction mixture dissolved in methyl ethyl ketone gave a varnish which when spread in thin films and baked for 25 minutes at 150° C. gave a flexible, insoluble film.

*Example X*

A mixture of 27.5 parts of resorcinal, 86 parts of para toluene sulfonamide, 130 parts of diglycid ether and 12.5 parts of monopotassium bisphenoxide was heated for 30 minutes at 110° C. to give an insoluble, infusible, molded object.

The same mixture dissolved in a ketone solvent gave a varnish which when spread in thin films and baked for 30 minutes at 150° C. gave a flexible, insoluble film.

*Example XI*

120 parts of p,p'-dihydroxy diphenyl sulfone, 45 parts of an amide derived from ammonia and soy bean oil acids in 300 parts of the product of Example I, were heated in the presence of 30 parts of monopotassium bisphenoxide for 25 minutes at 110° C. to give an insoluble, infusible, molded object.

A 50% solution of this mixture in methyl ethyl ketone spread in thin films and baked for 40 minutes at 150° C., gave a flexible film.

The above examples all illustrate proportions of polyhydric phenol, amide and polyepoxide such as to insure reaction of epoxide groups with both phenolic hydroxyl and amide groups; the number of epoxide groups of the polyepoxide being in excess of the number of phenolic hydroxyls of the polyhydric phenol and also in excess of the number of active amide hydrogens. The proportions of polyepoxide and polyhydric phenol vary from a small excess of polyepoxide in Example III, where the ratio of epoxide groups of the polyepoxide to phenolic hydroxyl groups is about 4 to 3, to a large excess of polyepoxide, as in Example X, where the ratio of epoxide groups to phenolic hydroxyl groups is about 4 to 1. The proportions of polyepoxide and amide vary in the above examples from an amount of polyepoxide less than twice that equivalent to the amide, as in Example VIII, where the ratio of epoxide groups of the polyepoxide to active amide hydrogen is about 1.5 to 1, to a large excess of polyepoxide as illustrated in Example XI, where the ratio of epoxide groups of the polyepoxide to active amide hydrogen is somewhat more than 6 to 1.

The proportions of polyhydric phenol and amide vary in the above examples from an amount of polyhydric phenol approximately half that equivalent to the amide (considering one phenolic hydroxyl equivalent to one active amide hydrogen) to an amount of polyhydric phenol greatly exceeding the amide as in Example XI, where the amide is about one-third the equivalent amount of polyhydric phenol.

Certain of the above examples illustrate equivalent or approximately equivalent proportions of reagents, that is proportions of polyepoxide equivalent to the polyhydric phenol plus amide, as in Examples VI and VIII. An excess of polyepoxide is illustrated in Examples IV, V, VII, IX, X and XI, the ratios of epoxide groups of the polyepoxide to phenolic hydroxyl groups of the polyhydric phenol and active hydrogens of the amide being approximately as follows:

In Example IV, 2.54:1:1; in Example V, 3:1.38:2; in Example VII, 3:1:1; in Example IX, 2.66:1:1; in Example X, 2:0.5:1; and in Example XI, 2:.96:.322. Less polyepoxide than that corresponding to the polyhydric phenol plus amide is illustrated in Example III, there the proportions of epoxide, phenolic hydroxyl and amide hydrogen of the respective materials is approximately 2:1.5:1. Thus, the ratio of polyepoxide to polyhydric phenol plus amide in the above examples varies from less than the equivalent amount to around one and one-half times the equivalent amount; the proportions of polyepoxide to polyhydric phenol vary from a small excess of polyepoxide to about four times the equivalent amount; the proportions of polyepoxide to polyfunctional amide vary from around one and one-half times the equivalent amount to more than six times the equivalent amount; and the proportions of polyhydric phenol and polyfunctional amide vary from about one-half the equivalent amount to about three times the equivalent amount.

The new compositions of the present invention are valuable products in the manufacture of varnishes, molded objects, adhesives, etc. being capable of reaction or polymerization to give products varying from hard, brittle, fusible solids to hard, non-brittle, infusible solids and giving reaction and polymerization products containing a high percentage of hydroxyl groups. The presence of these hydroxyl groups gives the converted products high adhesion to surfaces.

It is a characteristic of the process of the invention and the production of the new compositions that no byproducts are formed and that the reaction in general takes place in a dry state by the direct addition of phenolic hydroxyl groups and amido-hydrogen groups to the epoxide groups. Accordingly, the reaction can be carried out by using the initial ingredients in solution in organic solvents or in molding forms and carrying out the reaction after the solution has been applied as a film or to the molding composition in the mold with heating, to remove the solvent and to effect the reaction to produce the final, infusible products.

By using the polyhydric phenol and the amide in approximately equivalent proportion to the polyepoxide, or with an excess of the polyepoxide, a molding mixture can thus be made which will give a final, insoluble, infusible molded article.

Where the new complex compositions are prepared from mixtures containing an excess of the polyepoxide over that required to react with all of the active hydrogen groups present in the polyhydric phenol and the amide, such that the intermediate reaction products contain unreacted epoxide groups, such compositions may be advantageously used by adding compounds containing active hydrogen which will couple with or react with the epoxide groups. Among such compounds may be mentioned amines, phenol, amides, mercaptans, polyhydric alcohols, polyimines, etc. A wide variety of valuable reaction products can thus be obtained. Where the added compounds are polyfunctional reactants they may serve to crosslink different molecules through the terminal epoxide groups and in some cases through intermediate hydroxyl groups. By using a polyfunctional reactant that reacts with epoxide groups but not with hydroxyl groups, in proportions approximately equivalent to the epoxide groups, cross-linking of different molecules may be obtained as in the final hardening reaction. Where cross-linking reagents are used that react with hydroxyl, or with both hydroxyl and epoxide groups, a different and somewhat more complex composition may be obtained. The use of less than the equivalent amount of cross-linking reagents enables modified products to be obtained which may be fusible or infusible products or compositions.

Where the new compositions are made with the use of polyepoxides in proportions less than that equivalent to all of the active hydrogens present in the polyhydric phenols and amides, the intermediate or final products may contain free phenolic groups or free amide groups in addition to the alcoholic hydroxyl groups. Such products at an intermediate stage may be used with various cross-linking reagents which will react with the phenolic or amide groups to give more complex products. For example, in such cases, small amounts of polyepoxides can be added to the intermediate products to react with any excess phenolic hydroxyl or amide groups.

The intermediate products may be thus produced which are themselves capable of reaction, without the addition of cross-linking reactants, to form final infusible products on further heating. Other intermediate products may be advantageously used with added polyfunctional cross-linking reactants which will react with excess epoxide groups or amide groups or phenolic hydroxyl groups or alcoholic hydroxyl groups. Other cross-linking reactants which can be so used to convert intermediate products into high molecular weight products or final infusible products include diisocyanates, for example, methylene bis(4-phenyl) isocyanate, dialdehydes, e. g., glyoxal, dimercaptans, polyamides, etc.

Thus the present invention provides new compositions and new reaction products which are valuable as raw materials in the manufacture of varnishes, molding resins, adhesives, fibres, filaments, etc. In general, they are capable of polymerization, particularly in the presence of catalyst and by the use of cross-linking reactant and even in some cases without catalyst and cross-linking reactants, to form insoluble, infusible, final products. Where the further reaction or polymerization of a complex epoxide-containing composition takes place through epoxide and hydroxyl groups, the final reaction or polymerization products may be free, or relatively free, from epoxy groups and contain only, or mainly, hydroxyl groups in addition to hydrocarbon residues, ether linkages and carbon-nitrogen linkages.

The compositions of the present invention vary from liquid products to solids which may be fusible or infusible. In general, the new complex compositions and reaction products react and polymerize to give final products which contain a high percentage of hydroxyl groups. The final and infusible reaction and polymerization products made according to the present invention have a remarkable combination of desirable quality including resistance to water, solvents, alkalies, and acids, and they also have a remarkable toughness, flexibility, adhesion to surfaces, wettability to most pigments enabling them to be used in the manufacture of pigmented paints and enamels, and hardening of thick films through hardening action within the film itself when a suitable catalyst or cross-linking reactant was used.

I claim:

1. Amide-epoxy-phenol compositions containing substantial amounts of a polyepoxide free from functional groups other than epoxy and hydroxyl groups, a polyhydric phenol free from functional groups other than phenolic hydroxyl groups and a polyfunctional amide containing a plurality of active amide hydrogens, the proportion of epoxide groups of the polyepoxide being in excess of that equivalent to the phenolic hydroxyl groups of the polyhydric phenol and also in excess of that equivalent to the active amide hydrogens of the polyfunctional amide, and the amounts of polyhydric phenol and polyfunctional amide together being such that the phenolic hydroxyls of the polyhydric phenol and the active hydrogens of the amide together are more than half the equivalent of the epoxide groups of the polyepoxide.

2. Amide-epoxy-phenol compositions containing substantial amounts of a polyepoxide free from functional groups other than epoxy and hydroxyl groups, a polyhydric phenol free from functional groups other than phenolic hydroxyl groups and a polyfunctional amide containing a plurality of active amide hydrogens, the proportion of epoxide groups of the polyepoxide being in excess of that equivalent to the phenolic hydroxyl groups of the polyhydric phenol and also in excess of that equivalent to the active amide hydrogens of the polyfunctional amide, and the amounts of polyhydric phenol and polyfunctional amide together being such that the phenolic hydroxyls of the polyhydric phenol and the active hydrogens of the amide together are not less than half the equivalent of the epoxide groups of the polyepoxide and do not greatly exceed the equivalent amount.

3. Amide-epoxy-phenol compositions containing substantial amounts of a polyepoxide free from functional groups other than epoxy and hydroxyl groups, a polyhydric phenol free from functional groups other than phenolic hydroxyl groups and a polyfunctional amide containing a plurality of active amide hydrogens, the proportions of polyepoxide and polyhydric phenol being such that the polyepoxide contains at least about 1.33 epoxide groups for each phenolic hydroxyl group of the polyhydric phenol and not in excess of about 4 epoxide groups for each phenolic hydroxyl group.

4. Amide-epoxy-phenol compositions containing substantial amounts of a polyepoxide free from functional groups other than epoxy and hydroxyl groups, a polyhydric phenol free from functional groups other than phenolic hydroxyl groups and a polyfunctional amide containing a plurality of active amide hydrogens, the proportions of polyepoxide and polyfunctional amide being such that the number of epoxide groups of the polyepoxide for each active amide hydrogen is within the range of about 1.5 to 6.

5. Amide-epoxy-phenol compositions containing substantial amounts of a polyepoxide free from functional groups other than epoxy and hydroxyl groups, a polyhydric phenol free from functional groups other than phenolic hydroxyl groups and a polyfunctional amide containing a plurality of active amide hydrogens, the proportions of polyepoxide to polyhydric phenol plus polyfunctional amide varying from somewhat less than the equivalent proportions to approximately one and one-half times the equivalent proportions, and the proportions of polyepoxide to polyhydric phenol varying from somewhat more than the equivalent proportions to about four times the equivalent proportions, considering one epoxide group of the polyepoxide equivalent to one phenolic hydroxyl group of the polyhydric phenol and one active amide hydrogen.

6. Amide-epoxy-phenol compositions containing substantially amounts of a polyepoxide free from functional groups other than epoxy and hydroxyl groups, a polyhydric phenol free from functional groups other than phenolic hydroxyl groups and a polyfunctional amide containing a plurality of active amide hydrogens, the proportions of polyepoxide to polyhydric phenol plus polyfunctional amide varying from somewhat less than the equivalent proportions to approximately one and one-half times the equivalent proportions, the proportions of polyepoxide to polyhydric phenol varying from somewhat more than the equivalent proportions to about four times the equivalent proportions, and the proportions of polyepoxide to polyfunctional amide varying from about 1.5 times the equivalent proportions to about six times the equivalent proportions, considering one epoxide group of the polyepoxide equivalent to one phenolic hydroxyl group of the polyhydric phenol and one active amide hydrogen.

7. Amide-epoxy-phenol compositions containing substantial amounts of a polyepoxide free from functional groups other than epoxy and hydroxyl groups, a polyhydric phenol free from functional groups other than phenolic hydroxyl groups and a polyfunctional amide containing a plurality of active amide hydrogens, the amount of polyepoxide being approximately equivalent to the amount of polyhydric phenol plus polyfunctional amide, considering one epoxide group of the polyepoxide equivalent to one phenolic hydroxyl of the polyhydric phenol and one active amide hydrogen.

8. Compositions as defined in claim 1 in which the polyfunctional amide is an aliphatic polyamide.

9. Intermediate reaction products resulting from the partial reaction of the composition of claim 1, containing direct addition-reaction products of the polyepoxides with the polyhydric phenols and polyfunctional amides.

10. Intermediate reaction products resulting from the partial reaction of the composition of claim 1, containing direct addition-reaction products of the polyepoxides with the polyhydric phenols and polyfunctional amides, said intermediate reaction products having terminal epoxide groups.

11. Infusible articles and compositions containing infusible products of direct addition-reaction of the composition of claim 1.

12. The method of forming plastic compositions which comprises heating to cause direct addition-reaction of the polyepoxide with the polyhydric phenol and polyfunctional amide of claim 1.

SYLVAN OWEN GREENLEE.

REFERENCES CITED

The following references are of record in the file of this patent:

UNITED STATES PATENTS

| Number | Name | Date |
| --- | --- | --- |
| 2,089,569 | Orthner et al. | Aug. 10, 1937 |
| 2,136,928 | Schlack | Nov. 15, 1938 |
| 2,213,477 | Steindorff et al. | Sept. 3, 1940 |
| 2,324,483 | Castan | July 20, 1943 |